(12) United States Patent
Shiku et al.

(10) Patent No.: US 11,714,068 B2
(45) Date of Patent: Aug. 1, 2023

(54) EXOSOME PRODUCTION METHOD

(71) Applicant: Mie University, Tsu (JP)

(72) Inventors: Hiroshi Shiku, Tsu (JP); Naohiro Seo, Tsu (JP); Tsuguhiro Kaneda, Tsu (JP); Junko Nakamura, Tsu (JP); Kazunari Akiyoshi, Kyoto (JP)

(73) Assignee: Mie University, Mie (JP)

( * ) Notice: Subject to any disclaimer, the term of this patent is extended or adjusted under 35 U.S.C. 154(b) by 60 days.

(21) Appl. No.: 17/263,080

(22) PCT Filed: Jul. 31, 2019

(86) PCT No.: PCT/JP2019/029972
§ 371 (c)(1),
(2) Date: Jan. 25, 2021

(87) PCT Pub. No.: WO2020/027185
PCT Pub. Date: Feb. 6, 2020

(65) Prior Publication Data
US 2021/0239664 A1 Aug. 5, 2021

(30) Foreign Application Priority Data
Jul. 31, 2018 (JP) ................. 2018-143200

(51) Int. Cl.
*G01N 30/88* (2006.01)
*G01N 1/40* (2006.01)

(52) U.S. Cl.
CPC ............. *G01N 30/88* (2013.01); *G01N 1/405* (2013.01); *G01N 1/4077* (2013.01); *G01N 2001/4088* (2013.01)

(58) Field of Classification Search
CPC .......... B01D 2311/04; B01D 2311/08; B01D 2311/2623; B01D 2311/2676; B01D 15/363; B01D 2315/10; B01D 61/145; B01D 61/16; B01J 41/07; B01J 41/014; B01J 41/02; G01N 1/405; G01N 1/4077; G01N 2001/4088; G01N 2030/8831; G01N 30/88; G01N 30/96
USPC .... 436/161, 174, 175, 177, 178; 422/70, 72, 422/527, 533, 534; 435/29, 30
See application file for complete search history.

(56) References Cited

U.S. PATENT DOCUMENTS

| | | | |
|---|---|---|---|
| 6,899,863 B1 * | 5/2005 | Dhellin | B01D 15/3804 424/277.1 |
| 2013/0178383 A1 * | 7/2013 | Spetzler | G01N 33/57434 435/6.12 |
| 2014/0004601 A1 * | 1/2014 | Lim | C12N 5/0662 435/317.1 |
| 2016/0004298 A1 * | 1/2016 | Mazed | G09G 3/03 345/633 |
| 2017/0143812 A1 | 5/2017 | Ichim et al. | |

FOREIGN PATENT DOCUMENTS

| | | |
|---|---|---|
| JP | 2002-535665 A | 10/2002 |
| JP | 2018-501221 A | 1/2018 |
| WO | 2020/191369 * | 9/2020 |

OTHER PUBLICATIONS

Seo et al. Journal of Extracellular Vesicles, vol. 11, No. 3, article No. e12205, pp. 1-18, Mar. 2022.*
International Search Report and Written Opinion, PCT/JP2019/029972, Japan Patent Office, dated Oct. 29, 2019.
Ichiki et al., "Development of Analytical Platform of Nanoparticles for Accelerating Nanomedicine", Drug Delivery System, 2015, vol. 30, No. 3, pp. 204-211.

* cited by examiner

*Primary Examiner* — Maureen Wallenhorst
(74) *Attorney, Agent, or Firm* — Gavrilovich, Dodd & Lindsey LLP

(57) ABSTRACT

The disclosure provides a method for preparing exosomes using: (i) a step for ultrafiltering a sample containing at least one exosome; and (ii) a step for subjecting the sample that can be obtained from step (i) to anion exchange column chromatography.

6 Claims, 11 Drawing Sheets hPBMC EVs
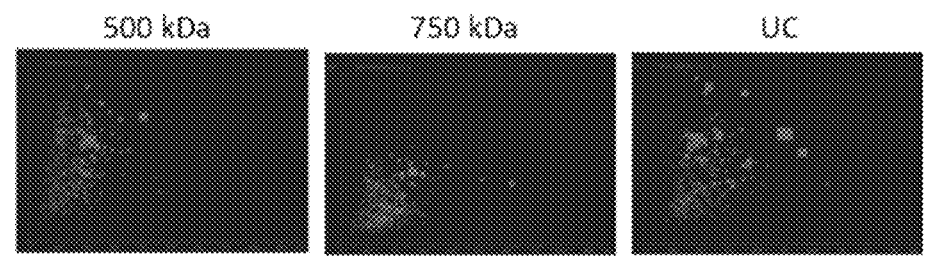
Jurkat EVs
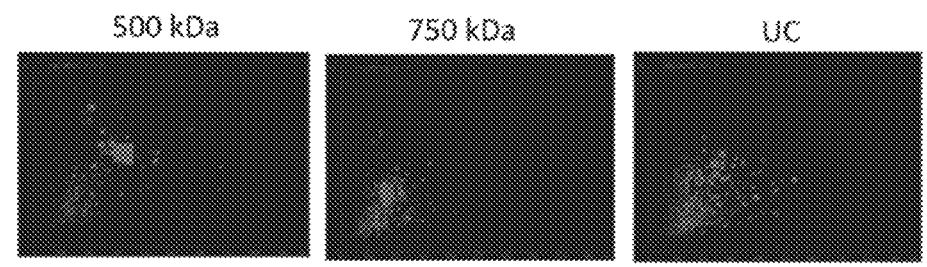
*FIG. 1*

(A)
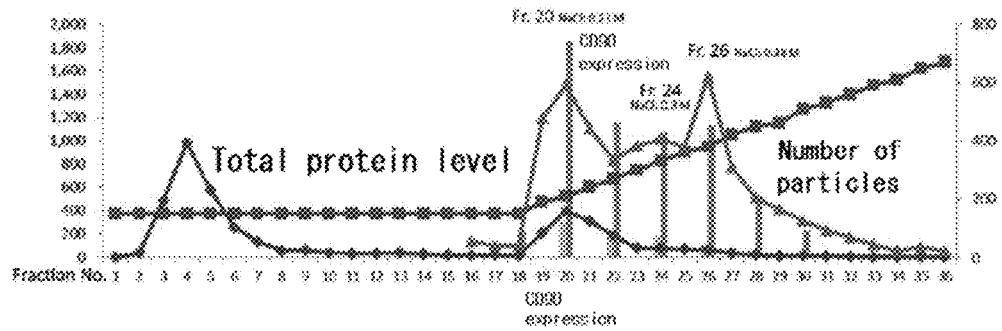
(B)
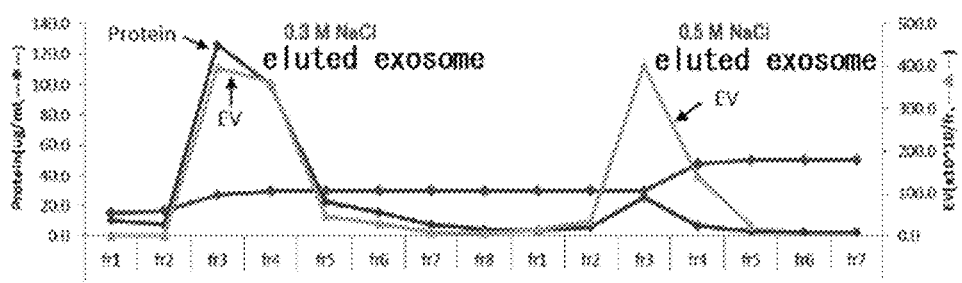
*FIG. 5A-B*
(A)
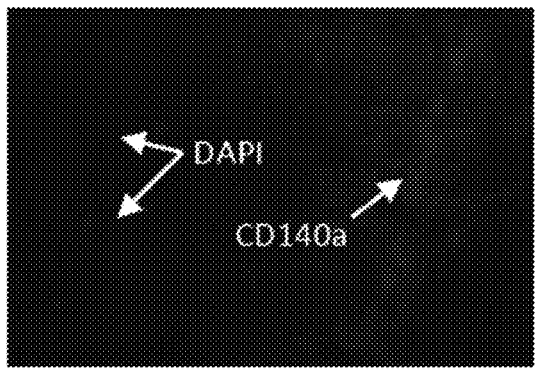
*FIG. 6A*
(B)
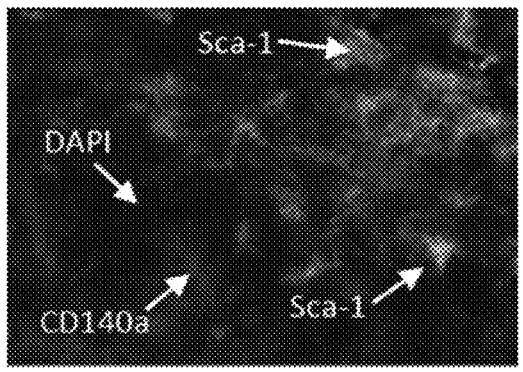
*FIG. 6B*

(A)

(B)

| | 0.3 M NaCl-eluted exosome miRNA number | 0.5 M NaCl-eluted exosome miRNA number |
|---|---|---|
| Let-7 family of miRNA and miRNA with 2-digit number (1-99) | twenty nine [illegible miRNA list] | three [illegible miRNA list] |
| miRNA with 3-digit number (100-999) | twenty seven [illegible miRNA list] | eighteen [illegible miRNA list] |
| miRNA with 4-digit number (1000-9999) | forty eight [illegible miRNA list] | seventy one [illegible miRNA list] |

FIG. 11

EXOSOME PRODUCTION METHOD

CROSS REFERENCE TO RELATED APPLICATIONS

This application is a U.S. National Phase Application filed under 35 U.S.C. § 371 and claims priority to International Application No. PCT/JP2019/029972, filed Jul. 31, 2019, which application claims priority to Japanese Application No. 2018-143200, filed Jul. 31, 2018, the disclosure of which are incorporated herein by reference.

FIELD OF THE INVENTION

The present invention relates to a method for preparing exosomes. Specifically, the present invention relates to a method for preparing exosomes from a biological sample and a system for preparing exosomes from a biological sample.

BACKGROUND OF THE INVENTION

A wide variety of cells including immune cells release lipid bilayer membrane vesicles of endosome and plasma membrane origin, termed as exosomes and microvesicles, with sizes 50-150 nm and 100-1000 nm, respectively (non-patent documents 1 and 2).

Exosomes are derived in endolysosomal system and are generated in multivesicular bodies (MVBs) by ESCRT-, Alix-, and Tsg101-dependent sorting likely with HIV budding, and released by fusion of MVBs with plasma membrane (non-patent documents 3 and 4). However, as known ESCRT-dependent and -independent pathways on exosome formation and differential packaging of micro (mi) RNAs and proteins in extracellular vesicles (EVs) from tumor cell lines (non-patent documents 5-7), it is assumed that EVs released from the same parent cells are structurally heterogeneous populations.

EVs participate in many biological regulations via prominently in intercellular communication (non-patent documents 1, 2 and 8). Pathophysiological roles of EVs are being decoded in various medical conditions and diseases such as mainly cancer (non-patent documents 9-11). Physiologically active substances including various proteins and nucleic acids (e.g., receptors, cytokines, intracellular signaling factors, mRNAs, and microRNAs (miRNAs)) are found in EVs, and they act as a central mediator of the modulation of adjacent and distant recipient cells after engulfing EVs (non-patent documents 7, 8 and 12).

Recently, the inventors have demonstrated that EVs are preferentially engulfed by mesenchymal cell populations in tumors, and $CD8^+$ T cell EVs involve in cytotoxicity against tumoral mesenchymal cells by its content, e.g., miRNA, resulting in prevention of tumor invasion and metastasis (non-patent document 13).

While the plasma membrane is mainly composed of phospholipids, the exosome membrane has been predicted to be enriched in sphingolipids (e.g., gangliosides), as demonstrated by inhibiting exosome budding in endosome by blocking ceramide biosynthesis, as well as accumulation of phosphatidylinositol-anchored proteins, G protein-coupled receptors and cholesterols (non-patent document 5, 14-16). In addition, as shown in membrane of dead cells, the membrane of EVs exposes negative charged phosphatidyl-serine (PS) on the outer leaflet in contrast with the localization at the inner leaflet of plasma membrane of viable cells. This is a major cause for EVs to take negative charge (non-patent documents 17 and 18).

Ultracentrifugation-based isolation techniques are widely used as a standard method in determining characteristics of EVs including biological significance (non-patent documents 19 and 20). In the ultracentrifugation, insoluble aggregated proteins in culture supernatants were also precipitated together with EVs in addition to the aggregated EVs (non-patent documents 21 and 22), appearing low reliability of biological activities in EV studies (non-patent document 23). Other than ultracentrifugation, density gradient centrifugation using sucrose gradient and affinity separation using tetraspanin molecule-specific monoclonal antibodies (mAbs) (e.g., anti-CD9, -CD63, or -CD81 mAb) or T cell immunoglobulin and mucin domain-containing molecule-4 (TIM-4) are frequently used in EV purification (non-patent documents 24-26). Although both affinity separation methods can obtain high-purity EVs, the former and the latter are difficult to prepare a large amount of EVs for biological analysis and EVs with a low negative charge, respectively. Thus, the standard method for preparing exosomes does not exist.

As a method for preparing a variety of exosomes having different properties from cell culture supernatants, an ultracentrifugation method of 100,000 to 120,000×g becomes a world standard. In addition, a combination method of the ultracentrifugation method and a density gradient centrifugation method using sucrose, an affinity purification method using an antibody specific to CD9, CD63 or CD81 of an exosome surface molecule, TIM-4 specific to phosphatidyl-serine (PS) in an exosome membrane, an ultrafiltration or gel filtration method to separate exosomes according to molecular sizes, or an ion exchange method using an ion exchange resin is known.

In the preparation of exosomes by the ultracentrifugation method, it is known that the exosome preparation is contaminated with a large amount of miscellaneous protein (over 70% of the total protein concentration) in the culture solution, and the exosomes themselves become aggregates and lose the activities. While the combination method of the ultracentrifugation method and the density gradient centrifugation method using sucrose or the affinity purification method targeting an exosome surface molecule gives a highly purified exosomes, it is hard to take a large amount of exosome. The gel filtration method is unsuitable to concentrate exosomes, the ultrafiltration method is insufficient in the purification of exosomes, and the combination method of the ultracentrifugation method and the subsequent ion exchange method affords remarkably low yield of exosomes. Furthermore, a method for preparing only exosomes having a focused function from exosome mixtures does not exist at present.

DOCUMENT LIST

Non-Patent Documents

Non-patent document 1: György B, Szabó T G, Pásztói M, Pál Z, Misják P, Aradi B, László V, Pállinger E, Pap E, Kittel A, Nagy G, Falus A, Buzás E I. Membrane vesicles, current state-of-the-art: emerging role of extracellular vesicles. Cell Mol Life Sci. 2011 68(16): 2667-2688. doi: 10.1007/s00018-011-0689-3.

Non-patent document 2: Gutiérrez-Vázquez C, Villarroya-Beltri C, Mittelbrunn M, Sánchez-Madrid F. Transfer of extracellular vesicles during immune cell-cell interactions. Immunol Rev. 2013 251(1): 125-142. doi: 10.1111/imr.12013.

Non-patent document 3: Colombo M, Moita C, van Niel G, Kowal J, Vigneron J, Benaroch P, Manel N, Moita L F, Théry C, Raposo G. Analysis of ESCRT functions in exosome biogenesis, composition and secretion highlights the heterogeneity of extracellular vesicles. J Cell Sci. 2013 126: 5553-5565. doi: 10.1242/jcs.128868.

Non-patent document 4: Sette P, Jadwin J A, Dussupt V, Bello N F, Bouamr F. The ESCRT-associated protein Alix recruits the ubiquitin ligase Nedd4-1 to facilitate HIV-1 release through the LYPXnL L domain motif. J Virol. 2010 84(16): 8181-8192. doi: 10.1128/JVI.00634-10.

Non-patent document 5: Trajkovic K, Hsu C, Chiantia S, Rajendran L, Wenzel D, Wieland F, Schwille P, Brügger B, Simons M. Ceramide triggers budding of exosome vesicles into multivesicular endosomes. Science. 2008 319(5867): 1244-1247. doi: 10.1126/science.1153124.

Non-patent document 6: van Niel G, Charrin S, Simoes S, Romao M, Rochin L, Saftig P, Marks M S, Rubinstein E, Raposo G. The tetraspanin CD63 regulates ESCRT-independent and -dependent endosomal sorting during melanogenesis. Dev Cell. 2011 21(4): 708-721. doi: 10.1016/j.devcel.2011.08.019.

Non-patent document 7: Palma J, Yaddanapudi S C, Pigati L, Havens M A, Jeong S, Weiner G A, Weimer K M, Stern B, Hastings M L, Duelli D M. MicroRNAs are exported from malignant cells in customized particles. Nucleic Acids Res. 2012 40(18): 9125-9138. doi: 10.1093/nar/gks656.

Non-patent document 8: Robbins P D, Morelli A E. Regulation of immune responses by extracellular vesicles. Nat Rev Immunol. 2014 14(3): 195-208. doi: 10.1038/nri3622.

Non-patent document 9: Royo F, Falcon-Perez J M. Liver extracellular vesicles in health and disease. J Extracell Vesicles. 2012 1: 18825. doi: 10.3402/jev.v1i0.18825.

Non-patent document 10: Wendler F, Stamp G W, Giamas G. Tumor-Stromal Cell Communication: Small Vesicles Signal Big Changes. Trends Cancer. 2016 2(7): 326-329. doi: 10.1016/j.trecan.2016.05.007.

Non-patent document 11: Becker A, Thakur B K, Weiss J M, Kim H S, Peinado H, Lyden D. Extracellular Vesicles in Cancer: Cell-to-Cell Mediators of Metastasis. Cancer Cell. 2016 30(6): 836-848. doi: 10.1016/j.ccell.2016.10.009.

Non-patent document 12: Muller L, Mitsuhashi M, Simms P, Gooding W E, Whiteside T L. Tumor-derived exosomes regulate expression of immune function-related genes in human T cell subsets. Sci Rep. 2016 6: 20254. doi: 10.1038/srep20254

Non-patent document 13: Seo N, Shirakura Y, Tahara Y, Momose F, Harada N, Ikeda H, Akiyoshi K, Shiku H. Activated CD8+ T cell extracellular vesicles prevent tumour progression by targeting of lesional mesenchymal cells. Nat Commun. 2018 9(1): 435. doi: 10.1038/s41467-018-02865-1.

Non-patent document 14: Estelles A, Sperinde J, Roulon T, Aguilar B, Bonner C, LePecq J B, Delcayre A. Exosome nanovesicles displaying G protein-coupled receptors for drug discovery. Int J Nanomedicine. 2007 2(4): 751-760.

Non-patent document 15: Wubbolts R, Leckie R S, Veenhuizen P T, Schwarzmann G, Mobius W, Hoernschemeyer J, Slot J W, Geuze H J, Stoorvogel W. Proteomic and biochemical analyses of human B cell-derived exosomes. Potential implications for their function and multivesicular body formation. J Biol Chem. 2003 278(13): 10963-10972.

Non-patent document 16: de Gassart A, Geminard C, Fevrier B, Raposo G, Vidal M. Lipid raft-associated protein sorting in exosomes. Blood. 2003 102(13): 4336-4344.

Non-patent document 17: Matsumoto A, Takahashi Y, Nishikawa M, Sano K, Morishita M, Charoenviriyakul C, Saji H, Takakura Y. Role of Phosphatidylserine-Derived Negative Surface Charges in the Recognition and Uptake of Intravenously Injected B16BL6-Derived Exosomes by Macrophages. J Pharm Sci. 2017 106(1): 168-175. doi: 10.1016/j.xphs.2016.07.022.

Non-patent document 18: Parolini I, Federici C, Raggi C, Lugini L, Palleschi S, De Milito A, Coscia C, Iessi E, Logozzi M, Molinari A, Colone M, Tatti M, Sargiacomo M, Fais S. Microenvironmental pH is a key factor for exosome traffic in tumor cells. J Biol Chem. 2009 284 (49): 34211-34222. doi: 10.1074/jbc.M109.041152.

Non-patent document 19: Lobb R J, Becker M, Wen S W, Wong C S, Wiegmans A P, Leimgruber A, Möller A. Optimized exosome isolation protocol for cell culture supernatant and human plasma. J Extracell Vesicles. 2015 4: 27031. doi: 10.3402/jev.v4.27031.

Non-patent document 20: Momen-Heravi F, Balaj L, Alian S, Mantel P Y, Halleck A E, Trachtenberg A J, Soria C E, Oquin S, Bonebreak C M, Saracoglu E, Skog J, Kuo W P. Current methods for the isolation of extracellular vesicles. Biol Chem. 2013 394(10): 1253-1262. doi: 10.1515/hsz-2013-0141.

Non-patent document 21: Baranyai T, Herczeg K, Onódi Z, Voszka I, Módos K, Marton N, Nagy G, Mäger I, Wood M J, El Andaloussi S, Pálinkás Z, Kumar V, Nagy P, Kittel Á, Buzás E I, Ferdinandy P, Giricz Z. Isolation of Exosomes from Blood Plasma: Qualitative and Quantitative Comparison of Ultracentrifugation and Size Exclusion Chromatography Methods. PLoS One. 2015 10(12): e0145686. doi: 10.1371/journal.pone.0145686.

Non-patent document 22: Willms E, Johansson H J, Mäger I, Lee Y, Blomberg K E, Sadik M, Alaarg A, Smith C I, Lehtio J, El Andaloussi S, Wood M J, Vader P. Cells release subpopulations of exosomes with distinct molecular and biological properties. Sci Rep. 2016 6: 22519. doi: 10.1038/srep22519.

Non-patent document 23: Xu R, Greening D W, Zhu H J, Takahashi N, Simpson R J. Extracellular vesicle isolation and characterization: toward clinical application. J Clin Invest. 2016 126(4): 1152-1162. doi: 10.1172/JCI81129.

Non-patent document 24: Zhang Z, Wang C, Li T, Liu Z, Li L. Comparison of ultracentrifugation and density gradient separation methods for isolating Tca8113 human tongue cancer cell line-derived exosomes. Oncol Lett. 2014 8(4): 1701-1706.

Non-patent document 25: Stranska R, Gysbrechts L, Wouters J, Vermeersch P, Bloch K, Dierickx D, Andrei G, Snoeck R. Comparison of membrane affinity-based method with size-exclusion chromatography for isolation of exosome-like vesicles from human plasma. J Transl Med. 2018 16(1): 1. doi: 10.1186/s12967-017-1374-6.

Non-patent document 26: Nakai W, Yoshida T, Diez D, Miyatake Y, Nishibu T, Imawaka N, Naruse K, Sadamura Y, Hanayama R. A novel affinity-based method for the isolation of highly purified extracellular vesicles. Sci Rep. 2016 6: 33935. doi: 10.1038/srep33935.

SUMMARY OF THE INVENTION

Problems to be Solved by the Invention

An object of the present invention is to provide a method for preparing a large amount of exosomes with high purity

Means of Solving the Problems

It is the most important objective to develop a method for fractionating biologically active exosomes from EVs in a miscellaneous culture medium while maintaining suppressive functions of T cell exosomes on cancer invasion and metastasis. To achieve this objective, it is important to establish a method for preparing exosomes without using an ultracentrifugation method. An ultrafiltration method using various ultrafiltration membranes having different molecular weight cut-off is considered as the most effective method to collect and concentrate biologically active exosomes from culture solutions when combined with a separation method utilizing the physical properties of the exosome. The combination can be an alternative to the ultracentrifugation method.

In keeping with the foregoing discussion, the inventors developed a novel method to obtain highly purified and high performance EVs having a different negative charge from a culture supernatant by using an anion exchange resin after concentrating and deproteinizing by ultrafiltration, as a result of intensive studies on the preparation of exosomes. Since it is indicated that functional EVs as taken up into target cells have a certain negative charge, this method has a high possibility to isolate EVs useful for drug delivery. The inventors have completed the present invention on the basis of these findings.

Accordingly, the present invention solves the problem by providing the invention as set forth in the following (1) to (37).

(1) An exosome production method comprising: (i) a step for ultrafiltering a biological sample containing exosomes; and (ii) a step for subjecting the sample that can be obtained from step (i) to anion exchange column chromatography.

(2) The method of the above-mentioned (1), wherein the ultrafiltration filter in ultrafiltration is a tangential flow filter.

(3) The method of the above-mentioned (2), wherein the ultrafiltration filter has a filter pore size of about 0.06 μm to about 0.07 μm.

(4) The method of the above-mentioned (2), wherein the tangential flow filter has a nominal molecular weight cut-off (MWCO) of about 750 kDa.

(5) The method of the above-mentioned (1), wherein the anion exchanger used in the anion exchange column chromatography is a weakly basic anion exchanger.

(6) The method of the above-mentioned (5), wherein the weakly basic anion exchanger retains selectivity based on both hydrophobic interaction and hydrophobic binding formation.

(7) The method of the above-mentioned (5) or (6), wherein the weakly basic anion exchanger has a phenyl group, an amide bond, and a carboxyl group.

(8) The method of any one of the above-mentioned (1)-(7), wherein the anion exchange column chromatography is carried out in the presence of 0.15 M to 0.8 M NaCl or KCl.

(9) The method of any one of the above-mentioned (1)-(8), wherein the column condition of the anion exchange column chromatography is performed at a pH of the neutral range.

(10) The method of any one of the above-mentioned (1)-(9), wherein the column condition of the anion exchange column chromatography is performed at a pH of 7.2 to pH 7.7.

(11) The method of any one of the above-mentioned (1)-(10), additionally comprising the following step of:
(iii) measuring the zeta potential of the eluate of the anion exchange column chromatography.

(12) A method for preparing exosomes from a biological sample, which comprises: (i) a step for performing centrifugal separation for a biological sample to remove contaminants from the sample, and then obtaining the supernatant; (ii) a step for subjecting the supernatant obtained in the step (i) to ultrafiltration, and then concentrating the supernatant; and (iii) a step for subjecting the concentrated liquid obtained in the step (ii) to anion exchange column chromatography.

(13) The method of the above-mentioned (12), wherein the step (i) comprises performing centrifugation at 10,000×g for 30 minutes.

(14) The method of the above-mentioned (12), wherein the ultrafiltration filter in ultrafiltration is a tangential flow filter.

(15) The method of the above-mentioned (12), wherein the ultrafiltration filter has a filter pore size of about 0.06 μm to about 0.07 μm.

(16) The method of the above-mentioned (12), wherein the tangential flow filter has a nominal molecular weight cut-off (MWCO) of about 750 kDa.

(17) The method of the above-mentioned (12), wherein the anion exchanger used in the anion exchange column chromatography is a weakly basic anion exchanger.

(18) The method of the above-mentioned (17), wherein the weakly basic anion exchanger retains selectivity based on both hydrophobic interaction and hydrophobic binding formation.

(19) The method of the above-mentioned (17), wherein the weakly basic anion exchanger has a phenyl group, an amide bond, and a carboxyl group.

(20) The method of any one of the above-mentioned (12)-(19), wherein the anion exchange column chromatography is carried out in the presence of 0.15 M to 0.8 M NaCl or KCl.

(21) The method of any one of the above-mentioned (12)-(20), wherein the column condition of the anion exchange column chromatography is performed at a pH of the neutral region.

(22) The method of any one of the above-mentioned (12)-(21), wherein the column condition of the anion exchange column chromatography is performed at a pH of 7.2 to pH 7.7.

(23) The method of any one of the above-mentioned (12)-(22), which additionally comprises the following step of:
(iv) measuring the zeta potential of the eluate of the anion exchange column chromatography.

(24) An exosome prepared by the method of any one of the above-mentioned (1)-(23), which forms the exosome pellets in which EV particles having a diameter of less than 60 nm and larger than 220 nm are essentially excluded, or said EV pellets resuspended in a physiological solution.

(25) A system for preparing exosomes from a biological sample, which comprises anion exchange column chromatography.

(26) The system of the above-mentioned (25), wherein the anion exchanger used in the anion exchange column chromatography is a weakly basic anion exchanger.

(27) The system of the above-mentioned (26), wherein the weakly basic anion exchanger retains selectivity based on both hydrophobic interaction and hydrophobic binding formation.

(28) The system of the above-mentioned (26) or (27), wherein the weakly basic anion exchanger has a phenyl group, an amide bond, and a carboxyl group.

(29) The system of any one of the above-mentioned (25)-(28), wherein the anion exchange column chromatography is carried out in the presence of 0.15 M to 0.8 M NaCl or KCl.

(30) The system of any one of the above-mentioned (25)-(29), wherein the column condition of the anion exchange column chromatography is performed at a pH of the neutral region.

(31) The system of any one of the above-mentioned (25)-(30), wherein the column condition of the anion exchange column chromatography is performed at a pH of 7.2 to pH 7.7.

(32) The system of any one of the above-mentioned (25)-(31), which additionally comprises an ultrafiltration filter.

(33) The system of the above-mentioned (32), wherein the ultrafiltration filter is a tangential flow filter.

(34) The system of the above-mentioned (32), wherein the ultrafiltration filter has a filter pore size of about 0.06 μm to about 0.07 μm.

(35) The system of the above-mentioned (33), wherein the tangential flow filter has a nominal molecular weight cut-off (MWCO) of about 750 kDa.

(36) The system of any one of the above-mentioned (25)-(35), which additionally comprises a centrifugal separator.

(37) The system of any one of the above-mentioned (25)-(36), which additionally comprises a zeta potential measurement device.

Effect of the Invention

According to the present invention, it is possible to provide highly purified exosomes having a focused function in large amounts.

The conventional method is not able to increase the degree of purity of a target exosome and to obtain a large amount of exosomes and is not suitable to prepare the most important functional exosomes. According to the present invention, it is possible to provide highly purified functional T cell-exosome in large amounts. In the future, the present invention can be an essential technique when exosomes are to be developed as pharmaceutical use.

BRIEF DESCRIPTION OF THE DRAWINGS

FIG. 1 shows a comparison of exosome concentrates prepared by ultrafiltration of 500 kDa and 750 kDa molecular weight cut-off (MWCO) with exosome preparations prepared by ultracentrifugation (UC). Exosome concentrates with less aggregates can be prepared by ultrafiltration of 750 kDa MWCO without leak of exosome particles through the membrane.

FIG. 5A-B is a diagram showing an elution pattern eluted from a DEAE Sepharose column for exosomes derived from CD8$^+$ T cells obtained from DUC18 mice. (A) An elution pattern eluted with a linear gradient of NaCl (0.15 M to 0.8 M) is shown. The bar in the figure shows the expression level of CD90. Fr. 20, Fr. 24, and Fr. 26 were eluted fractions with 0.21 M, 0.3 M, and 0.38 M NaCl, respectively. (B) The elution pattern eluted in stepwise of 0.3 M and 0.5 M NaCl is shown.

FIG. 6A-B is a fluorescence microphotograph showing cytotoxic activities of exosomes fractionated by anion exchange column chromatography for spheroids formed from MKN45 cells and CAF derived from lung cancer. (A) A fluorescence microphotograph showing the activity of exosome (Fr. 21) eluted with 0.21 M to 0.3 M NaCl. (B) A fluorescence microphotograph showing the activity of exosome (Fr. 26. Eluted with 0.38 M NaCl.

FIG. 11 shows a result of analyzing the type of miRNA contained in exosomes eluted with 0.3 M and 0.5 M NaCl in anion exchange column chromatography.

MODE FOR CARRYING OUT THE INVENTION

Figure 2:
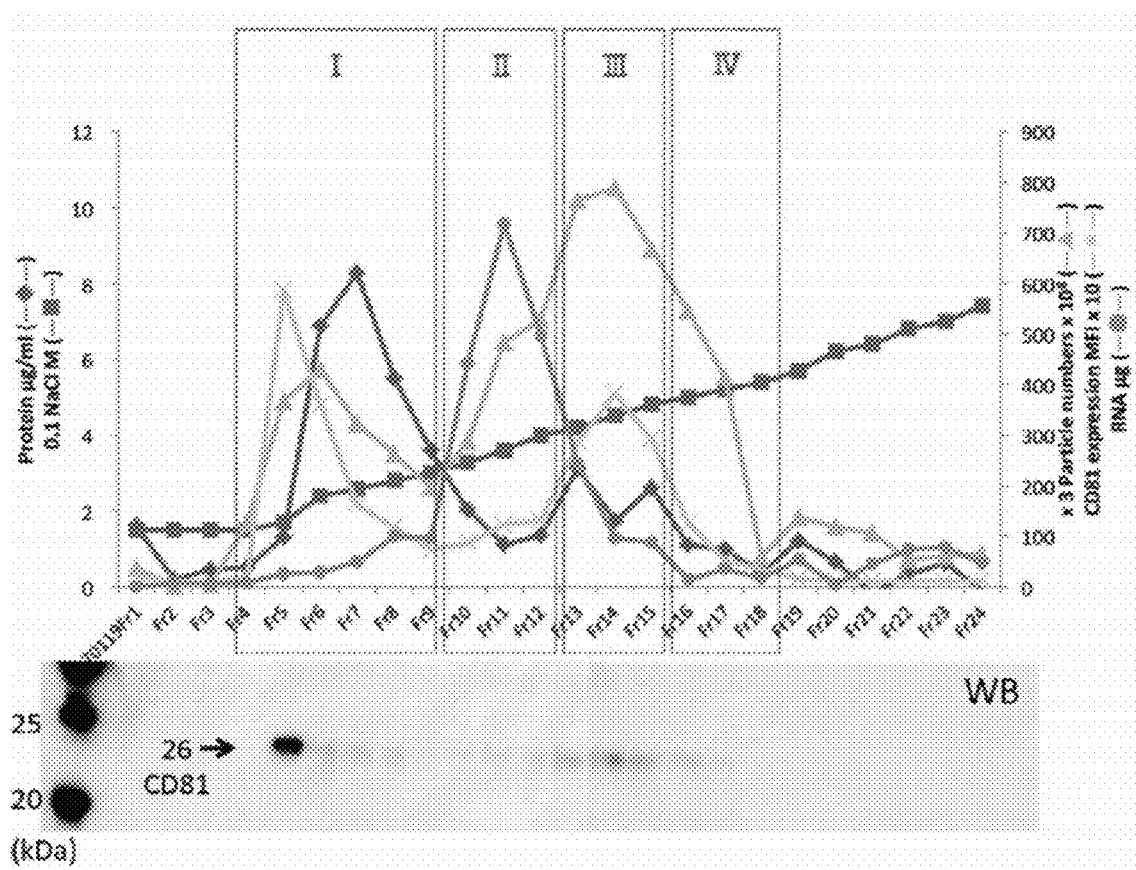
FIG. 2 is a diagram showing that exosomes having different physical properties such as protein content and CD81 expression can be efficiently separated by using a DEAE sepharose column for exosomes after subjecting to 750 kDa MWCO. The upper figure shows the elution pattern from the column, and the lower figure shows the results of performing Western blot analysis (WB) of the CD81 for the fractionated fraction.

In the present invention, a method for preparing exosomes from a biological sample containing exosomes comprises a step of filtering the biological sample. Ultrafiltration by an ultrafiltration filter is preferable as the filtering means. As the ultrafiltration system, for example, a normal flow system in which both the flow of the liquid to be filtered and the pressure for filtration are in the same direction, and a tangential flow system in which the liquid flows in the parallel direction along the surface of the filter are exemplified, but the ultrafiltration by the tangential flow is preferable. For example, in one embodiment, the ultrafiltration filter is a tangential flow filter. In one embodiment, the ultrafiltration filter has a filter pore size of about 0.06 µm to about 0.07 µm. In one embodiment, the tangential flow filter has a nominal molecular weight cut-off (MWCO) of about 750 kDa. A commercially available ultrafiltration filter including a tangential flow filter may be used for the method of the present invention. For example, a hollow fiber filter MicroKros (Registered Trade Name) from Spectrum Laboratories may be used.

In the present invention, a method for preparing exosomes from a biological sample containing exosomes comprises a step for subjecting a sample that can be obtained from ultrafiltration to anion exchange column chromatography. Although the ion exchanger used for anion exchange column chromatography is not specifically limited, a weakly basic anion exchanger is preferable, and a weakly basic anion exchanger having a selectivity based on both hydrophobic interactions and hydrogen bonds is more preferable. For example, CaptoMMC (GE Healthcare), a weak basic anion exchanger having a selectivity based on both hydrophobic interactions and hydrogen bonds with a phenyl group, an amide bond and a carboxyl group, may be used.

The anion exchange column chromatography is preferably carried out in the presence of 0.15-0.8 M NaCl or KCl. As the column condition of the anion exchange column chromatography, the pH of the column eluate is preferably in a neutral region (pH 5.8 to pH 8.6), more preferably in pH 7.2 to pH 7.7, and most preferably in pH 7.

In one aspect of the present invention, a method for preparing exosomes from a biological sample may include a step to remove contaminants such as unwanted large cell debris and apoptotic bodies from a biological sample prior to ultrafiltration. This process is usually performed by centrifugation. For example, centrifugation at 4° C. and 10,000×g for 20 minutes may be performed. Those skilled in the art appreciate that the process of centrifugation may be performed using a commercially available suitable laboratory centrifuge (e.g., Thermo Scientific (Registered Trade Name), Cole-Parmer (Registered Trade Name), etc.). To isolate highly purified exosomes, the supernatant obtained by the centrifugation may be subjected to additional centrifugation to further remove the cell debris and the apoptotic bodies.

The process including centrifugal separation to obtain the supernatant by removing contaminants such as cell debris and apoptotic bodies may be carried out one or more times. In this case, the supernatant may be separated from the centrifuged residues containing debris by decanting or aspirating using pipettes, followed by performing additional centrifugation, as necessary. In the case of performing additional centrifugation, the centrifugal acceleration (g) may be increased to remove the cell debris equal to or less than the medium size.

The method of the present invention provides a means for obtaining biologically intact exosomes derived from mammals and non-mammals having a purity of at least about 99.0%, preferably at least about 99.9% or more. "Purity of at least about 99.0%, preferably at least about 99.9% or more", as used herein, means that cell debris, apoptotic bodies and microvesicles having a diameter of less than 60 nm and greater than 220 nm are "essentially removed". The term "biologically intact" includes, for example, a state that it is not aggregated or agglomerated, and not damaged such that a hole is opened.

Furthermore, the method of the present invention allows to obtain exosomes in large amounts. For example, an exosome of about 1000 to 1500 µg can be obtained as an amount of the total protein from 300 to 500 mL of cell culture solution. Thus, according to the method of the present invention which enables high yield of exosomes, preparation of exosome-containing solution having an exosome concentration of at least about 2 µg/mL, preferably at least about 3 to 5 µg/mL or more can be easily achieved. As used herein, the term "about" for any given numerical value means that the numerical value includes ±10% of the value, i.e., 10% greater than, or 10% less than the value.

Exosomes prepared by the methods described herein usefully retain integrity and have high purity (where the presence of substances having a diameter of less than 60 nm and greater than 220 nm is essentially negligible), stability and biological activities in vitro and in vivo. Such exosomes cannot be obtained heretofore. Thus, the exosomes of the present invention are uniquely useful, for example, in diagnosis and/or treatment. Since the exosomes of the present invention have been confirmed to be non-allergenic, the exosomes can be safely used for the autologous, allogeneic, and xenogeneic systems.

The exosome obtained using the method of the present invention may be prepared as a therapeutic formulation in combination with a pharmaceutically or physiologically acceptable carrier. The term "pharmaceutically acceptable" or "physiologically acceptable" means that it is acceptable to be used in the pharmaceutical field and in the veterinary field, that is, suitable for physiological use without unacceptable toxicity. Those skilled in the art will appreciate that the carrier to be chosen may vary depending on the intended use of the exosome. In one embodiment, the exosome is prepared in a formulation suitable for administration by infusion or injection (e.g., subcutaneous, intraperitoneal, intramuscular, or intravenous injections). Thus, the exosome formulation may be prepared as a suspending agent suspended in a physiologically acceptable medical grade carrier such as a pyrogen-free sterile aqueous solution (it may be a buffer or isotonic solution as necessary). The usable carriers include distilled water (not including RNA and DNA degrading enzymes), a sterile solution containing sugar (e.g., sucrose or dextrose), and sterile physiological saline containing sodium chloride (which may be a buffer solution as necessary). Suitable saline may contain sodium chloride at various concentrations. For example, it may be physiological saline at normal concentration (0.9%), at ½ concentration (0.45%), ¼ concentration (0.22%). In addition, a solution containing sodium chloride at higher concentrations (for example, 3% to 7% or more) may also be used. The saline may contain ingredients other than sodium chloride such as dextrose, as necessary. The physiological saline containing ingredients other than sodium chloride includes Ringer's solution (e.g., lactated and acetate Ringer's solutions), phosphate-buffered saline (PBS), Tris(hydroxymethyl)aminomethane-buffered saline (TBS), Hank's balanced salt solution (HBSS), Earle's balanced salt solution (EBSS), standard citrate physiological saline (SSC), HEPES-buffered saline (HBS), Gey's balanced salt solution (GBSS), and the like.

In another embodiments, the exosome is prepared in a formulation suitable for a route of exosome administration. Said route includes, but are not limited to, oral, intranasal, intestinal, topical, sublingual, intraarterial, intramedullary, intrathecal, inhalation, intraocular, transdermal, vaginal, rectal, etc. Each formulation contains a carrier suitable for each route of exosome administration. For example, a topically applied exosome composition may be prepared by blending suitable carriers. The topically applied cream, lotion, and ointment may be prepared using a suitable base such as a triglyceride base. Said creams, lotion, and ointment may further contain a surfactant. It is also possible to prepare an aerosol formulation using a suitable propellant. In addition, irrespective of the administration route, the composition of the present invention may contain other additives such as an antibacterial agent, an antioxidant, and other preservatives to prevent the growth of microorganisms and/or decomposition during long-term storage.

The exosome pellets can be stored before use. For example, according to the established method, said pellets may be refrigerated at 4° C., frozen or lyophilized to be stored. The exosome pellets may be stored in any physiologically acceptable carrier, and may be stored in the carrier containing a stabilizer under a low temperature and/or a vitrification agent (e.g., DMSO, glycerol, trehalose, polyhydroxy alcohol such as methoxy glycerol, propylene glycol), M22, etc.).

The exosome prepared by the method of the present invention is useful as a vehicle to deliver a cargo (e.g., a substance such as a biological material, a therapeutic agent and so on) used for the treatment of diseases or other pathological conditions in mammals, based on its unparalleled properties (e.g., high purity, integrity, and superior stability).

DETAILED DESCRIPTION OF THE INVENTION

The present invention is explained in more detail by the following examples. These examples are merely illustrative and are not intended to limit the scope of the invention.

Example 1

(Materials and Methods)
Mice and Cell Lines

H-2Kd-restricted and mutated (m) ERK2 136-144 peptide-specific TCR (Vα10.1/Jα48 and Vβ8.3/Dβ2.1/Jβ2.6) gene-transfected DUC18 mice were maintained at the Experimental Animal Facility of Mie University, and used at 8-10-weeks old. I-Ab-restricted and OVA 323-339 peptide-specific TCR-transgenic OT-II mice were purchased from Charles River. The Ethics Review Committee for Animal Experimentation of Mie University approved the experimental protocols (Approval No.: 23-8). HEK293, HEK293.2sus, Jurkat E6.1, and Molt-4 were purchased from American type culture collection. Bone-marrow MSCs (Mesenchymal Stem Cells) from adult human were purchased from Lonza.

Preparation of Culture Supernatants

EV (extracellular vesicle)-depleted fetal calf serum (dFCS) and autologous plasma were prepared by the ultracentrifugation at 100,000×g for 18 h. Nonadherent HEK293.2sus were cultured in 293 SFM II medium (ThermoFisher Scientific) at $5 \times 10^5$ cells/mL in 100 mL erlenmeyer flask (Corning) under 100 rpm rotation and an 8% $CO_2$ atmosphere. HEK293, Jurkat E6.1, and Molt-4 were cultured in DMEM medium (Wako chemical) or AIM-V medium (Thermofisher Scientific) supplemented with 10% dFCS in 70 cm² culture flask (Corning) under a 5% $CO_2$ atmosphere. Culture medium was changed every third or fourth day, and obtained culture supernatants were pooled, and used for EV preparation.

Human peripheral blood mononuclear cells (PBMCs) were prepared by the density separation method using Ficoll-Paque PLUS (GE Healthcare). PBMCs were cultured for two weeks at a concentration of $2 \times 10^5$ cells/mL in GT-T503 medium (Takara Bio) supplemented with 0.6% EV-depleted autologous plasma, 0.2% human serum albumin (CSL-Behring), and 600 IU/mL recombinant (r) human IL-2 in the plates coated with 5 μg/mL anti-human CD3 mAb (OKT-3: eBioscience) and 25 μg/mL RetroNectin (Takara Bio). The study was conducted in accordance with the current version of the Declaration of Helsinki. Written informed consent was obtained from all healthy donors participating in this study. The experimental procedure was approved by ethics review committees of the Mie University Graduate School of Medicine (Approval No.: 2879).

Murine cytotoxic T-lymphocytes (CTLs: $CD8^+$ T cells) or helper T (Th) cells ($CD4^+$ T cells) were obtained from splenocytes of DUC18 or OT-II mice, respectively. DUC18 or OT-II splenocytes were cultured for 3 days at a concentration of $0.5 \times 10^6$ cells/mL in RPMI-1640 medium (Sigma-Aldrich) containing 1 μg/mL of mERK2 (136-144: QYIHSANVL) or OVA (323-339: ISQAVHAAHAEINEAGR) peptide, respectively, and 10% dFCS, and then supplemented with 100 IU/mL rIL-2 for a further 4 days.

EV Preparation by Ultracentrifugation

First, culture supernatants were centrifuged at 10,000×g for 20 min, filtrated through 0.45- and 0.22-μm filters, and then subjected to ultracentrifugation. The ultracentrifugation was performed for 2 h at 100,000×g (SW28 rotor: Beckman Coulter). The obtained EV-containing pellets were suspended in phosphate buffered saline (PBS), recentrifuged at 100,000×g, dissolved in 0.5 to 2 mL PBS, and stored at 4° C.

Ultrafiltration of Culture Supernatants

Ultrafiltration of culture supernatants was performed by tangential flow filtration system (KrosFlo Research Iii TIFF system, Silicon tube #16 (ACTUE1625N): Spectrum) using mPES MidiKros Filter Modules (MWCO 500 kDa or 750 kDa: Spectrum) at the entrance flow rate of approximately 50 mL/min. Culture supernatants were concentrated to 20 times or more and replaced with 200 mL PBS or more PBS. The resultant concentrated supernatant/PBS was subjected to anion exchange column chromatography after measuring the EV number, diameter, and protein concentration.

Anion Exchange Column Chromatography

DEAE-sepharose Fast Flow (GE Healthcare) was used as a carrier for anion exchange chromatography. DEAE-sepharose column (bed volume 8 cm³) was equilibrated with 10 mM Tris-HCl (pH 7.5) containing 0.15 M NaCl. An EV-containing PBS solution concentrated with MWCO 750 kDa ultrafiltration was loaded on the column and washed with TBS of three times or more of the column volume. EVs bound with DEAE-sepharose were eluted with linear gradient of NaCl (0.15 M to 0.8 M with a gradient maker) and fractionated by 3.5 mL. The electrical conductivity of each fraction was then measured with LAQUAtwin (Horiba Scientific) to calculate the accurate NaCl concentration, and then immediately returned to a physiological saline solution (0.15 M) containing 10 mM Tris-HCl (pH7.5). Fractionated EV solutions were subjected to measure the number of particles and particle diameter, protein concentration, flow cytometric analysis for CD81 expression, western blot analysis for CD81, and examination for MSC engulfment.

Characterization of EVs

The protein concentration of the EVs was assessed by bicinchoninic acid (BCA) protein assay kit (Pierce) according to the manufacturer's instructions. The average particle number and diameter of the purified EVs were measured by nano-tracking analysis (NTA; LM10-HS: NanoSight). The surface proteins of EVs were detected by flow cytometric analysis by FACS Cant II (BD) of the latex beads-bound EVs stained with fluorescein phycoerythrin (PE)-conjugated anti-CD81 mAb (5A6: Biolegend). Polystyrene latex beads (10 μm in diameter) were mixed with EV solutions at a ratio of 3 EV particles/bead in 0.1 M 2-morpholinoethanesulfonic acid buffer, incubated for 2 h on a rotating shaker, and then blocked with 400 mM glycine. The obtained EVs bound to latex beads were washed twice with PBS containing 2% dFCS.

Western blot analysis was performed to detect EV proteins including surface proteins as follows. Cell proteins were extracted with cell lysis buffer (Cell Signaling Technology) according to the manufacturer's instructions. EVs and cell proteins were dissolved in Laemmli sample buffer (Bio-Rad) with (for perforin, granzyme B, Alix, and Tsg101 detections) or without (for CD9 detection) 5% 2-mercaptoethanol (ME), and boiled for 5 min. 5 μg of each protein sample and molecular weight markers (MagicMark XP Standard: Thermo Fisher Scientific) were separated by 10% polyacrylamide gel electrophoresis (e-PAGEL E-R10L: ATTO Corporation) using SDS running buffer (Bio-Rad) at 40 mA for 60 min. The resulting gel was immersed 3 times in a transfer buffer (Bio-Rad). The proteins were transferred onto Immobilon-P polyvinylidene fluoride membrane (Merck) with a Trans-Blot SD Semi-Dry Transfer Cell (Bio-Rad) at 1 mA/cm$^2$ for 1 h, blocked with 5% skim milk (Wako Pure Chemical Industries) in 0.05% TTBS (TBS containing 0.05% Tween 20), and then treated with a primary monoclonal antibody (mAbs) specific for CD9 (eBioKMC8: eBioscience), perforin (eBioOMAK-D: ThermoFisher Scientific), granzyme B (21631: R&D Systems), Alix (3A9: Biolegend), or Tsg101 (EPR7130: Abcam) at 4° C. overnight. After washing 3 times with 0.05% TTBS, the membrane was incubated with horseradish peroxidase-conjugated secondary antibody specific for mouse IgG (GE Healthcare), rat IgG (R&D Systems), or rabbit IgG (MBL International Corporation) at room temperature for 1 h. After washing 4 times with 0.05% TTBS, the membranes were treated with ECL plus (GE Healthcare) and visualized with LAS-4000 (Fujifilm).

Relative amount of EV RNAs was examined by monitoring with Bioanalyzer 2100 (Agilent). RNAs in $5\times10^8$ EVs were extracted with miRNeasy Mini Kit (Qiagen). After measuring RNA concentration by NanoDrop 2000 (ThermoFisher), EV-derived RNAs including miRNAs were analyzed by Bioanalyzer 2100 (Agilent) using Small RNA Kit (Agilent) according to the manufacturer's instructions.

Preparation of Murine MSCs (Mesenchymal Stem Cells)

MSCs were prepared from bone-marrow-cell flushed thighbones (femurs) according to the according to the manufacturer's instructions (StemCell Technologies). Both ends of 10 femurs from BALB/c mice were cut down, transferred to 5 mL of PBS in a mortar and crushed by gentle stirring with a pestle for 5 min to remove as many as possible of red bone marrow cells. Similarly, after the red bone marrow cells are removed five times, the fragmented white femurs were collected and incubated with PBS supplemented with 0.2% collagenase type I (Sigma). After vigorous shaking at 37° C. for 40 min in a water bath, the supernatant containing MSCs was washed 3 times with PBS. Dish-adherent MSCs were cultured for 30 days in mouse MesenCult MSC basal medium supplemented with 20% MSC stimulatory supplement (StemCell Technology). The medium is changed every other day. The potential of the obtained MSCs to differentiate into adipocytes and osteocytes was tested by using 70% confluent MSCs in MesenCult MSC basal medium supplemented with 20% adipogenic and osteogenic stimulatory supplements for 2 weeks, and then staining with Oil Red O (Sigma-Aldrich) for adipocytes and Alizarin Red S (Wako Pure Chemical Industries) for osteocytes. Colony formation in primary MSCs cultured in MSC stimulatory supplement-containing medium was observed after staining with Giemsa (Wako Pure Chemical Industries). The purity of the cultured bone-derived MSCs was confirmed to be 95% or more by flow cytometric analysis (FACScant II: BD Biosciences) using both PE-conjugated anti-CD140a and FITC-conjugated anti-Sca-1 mAbs (both from Biolegend).

Measurement of EV-Engulfed Mesenchymal Stem Cells

EVs (1 mg/mL protein concentration) were labelled with PKH26 (Sigma-Aldrich) according to the manufacturer's instructions. Human mesenchymal stem cells (Lonza) were cultured in 12-well plates and treated with PKH26-stained EVs (5 μg/mL EV concentration) for 2 h. Engulfment by the cells of PKH26-stained EVs was examined by flow cytometric analysis (FACS Cant II: BD) and fluorescence microscopy (BX53 with DP73 camera: Olympus).

(Results)

Figure 4:
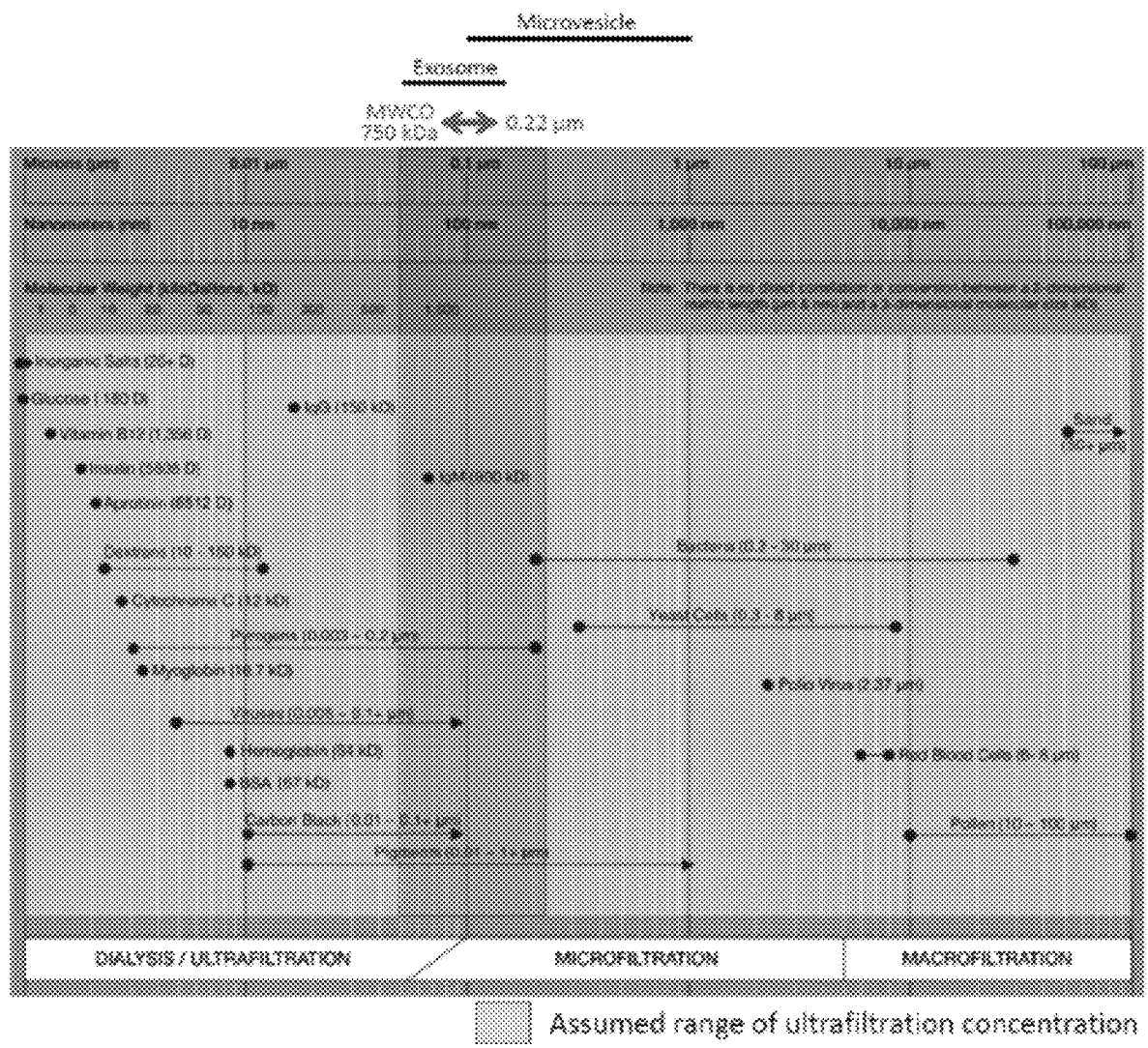
FIG. 4 shows that exosomes of almost all sizes can be concentrated by an ultrafiltration method using a filter with pore size of 0.22 μm and 750 kDa MWCO.

High Efficacy of Ultrafiltration on Concentration of EVs and Removal of Unnecessary Proteins in Culture Supernatants FIG. 4 shows a pore size chart obtained from Spectrum Lab. This chart provides a relative scale for comparing common items on molecular biological and microbiological scales. The chart correlates two-dimensional metric units (μm and nm) to three-dimensional molecular weight units (kDa). The diameter of the exosome is referred to as 50 nm to 200 nm. Exosomes concentrated with an ultrafiltration membrane of 750 kDa MWCO after 0.22 μm filter treatment can cover all exosomes of 50 nm to 220 nm in diameter, as shown in the figure. Contamination of vesicles with lower particle sizes and without functionality which are included in the apoptotic bodies cannot be avoided by use of MWCO 500 kDa filter for concentration in ultrafiltration. Ultrafiltration with a MWCO 750 kDa filter equivalent to about 50 nm of the filter pore size would be especially useful for concentrating exosomes from various EVs in the culture supernatant. It has been reported from other groups that EVs can be concentrated for clinical use from culture supernatants by ultrafiltration using MWCO 500 kDa filter. Therefore, we examined whether EVs can be effectively concentrated while removing unnecessary insoluble proteins from 220 nm-filtrated culture supernatants without leakage of exosomes by using a 750 kDa pore rating mPES filter module (spectrum).

Concentrated EVs prepared by ultrafiltration with a MWCO 750 kDa filter of the culture supernatant from hPBMCs or Jurkat E6.1 cells were compared with those prepared by ultrafiltration with a MWCO 500 kDa filter as well as those prepared by ultracentrifugation at 100,000×g. The particle sizes of these EVs are compared by NTA. As a result, a large number of aggregates having larger particle sizes were observed in the exosomes prepared by concentrating with the MWCO 500 kDa ultrafiltration membrane and by the ultracentrifugation. However, it is found that the concentration with the MWCO 750 kDa ultrafiltration membrane reduces the appearance of aggregates and has the exosomes concentrated while the exosomes are kept in a single particle with approximately 150 nm particle size. When a 750 kDa cut-off filter is used, the leakage of vesicles is hardly observed as compared with the case of using a 500 kDa cut-off filter, and the supernatants from both cell lines were efficiently concentrated to 20 times or more in a short time. The purity of the EVs obtained by using a MWCO 750 kDa filter was not reached to 99% purity which was achieved by the ultracentrifugation, but 97% or more of the total particle index obtained by measuring the number of particles by the nano-site of the culture supernatant is 97% or more (FIG. 1). In addition, it has been found that when concentrated using a MWCO 750 kDa ultrafiltration membrane, there is almost no out-of-membrane leakage of exosome particles.

Fractionation of Highly Purified EV According to the Degree of Negative Charge of EVs HEK 293.3 SUS cells produced a number of EVs ($1\times10^{10}$ particles/mL of medium). Therefore, firstly, ion exchange column chromatography was performed for a large amount of EVs obtained from the culture supernatant of HEK293.2sus cells. In the process of the EV separation, it became obvious that a maximal of 2 to $5\times10^{11}$ particles of EVs can be bind with a DEAE-Sepharose resin of 8 cm$^3$. The elution profiles of HEK293sus EVs based on protein concentrations, number of particles, CD 81 expression and RNA content are shown in FIG. 2 along with the data of NaCl linear gradient. Almost all of the applied $3\times10^{11}$ EVs were bound to the column and recovered by 100%, suggesting that all EVs were negatively charged and eluted with four peaks for the number of particles; fractions I (Fr. 4-Fr. 9), II (Fr. 10-Fr. 12), III (Fr. 13-Fr. 15) and IV (Fr. 16-Fr. 18). The fraction I, II, III and IV correspond to the range of NaCl concentration of 0.15 M-0.17 M, 0.18 M-0.36 M, 0.37 M-0.45 M and 0.46 M-0.52 M, respectively. CD81 as an EV marker was strongly expressed on EVs of the fraction I, and EVs of the fractions II, III and IV exhibited moderate expressions of CD81. Surprisingly, it was found that EVs of the fraction II contained a large amount of RNA, but in contrast, EVs of fractions I, III and IV contained little RNA. The amount of RNA per $10^8$ EVs of the fraction II was 2.8 ng which was 6- to 20-fold higher than the other three fractions. In another chromatography using culture supernatants of murine CD8$^+$ T cells, murine CD4$^+$ T cells, hPBMCs, Jurkat cells and Molt-4 cells. An elution profile similar to HEK293.2sus EVs was obtained. As described above, it has been found that the expression intensity of CD81 known as an exosome marker, RNA content and protein content are entirely different in each fraction (FIG. 2).

Figure 3:
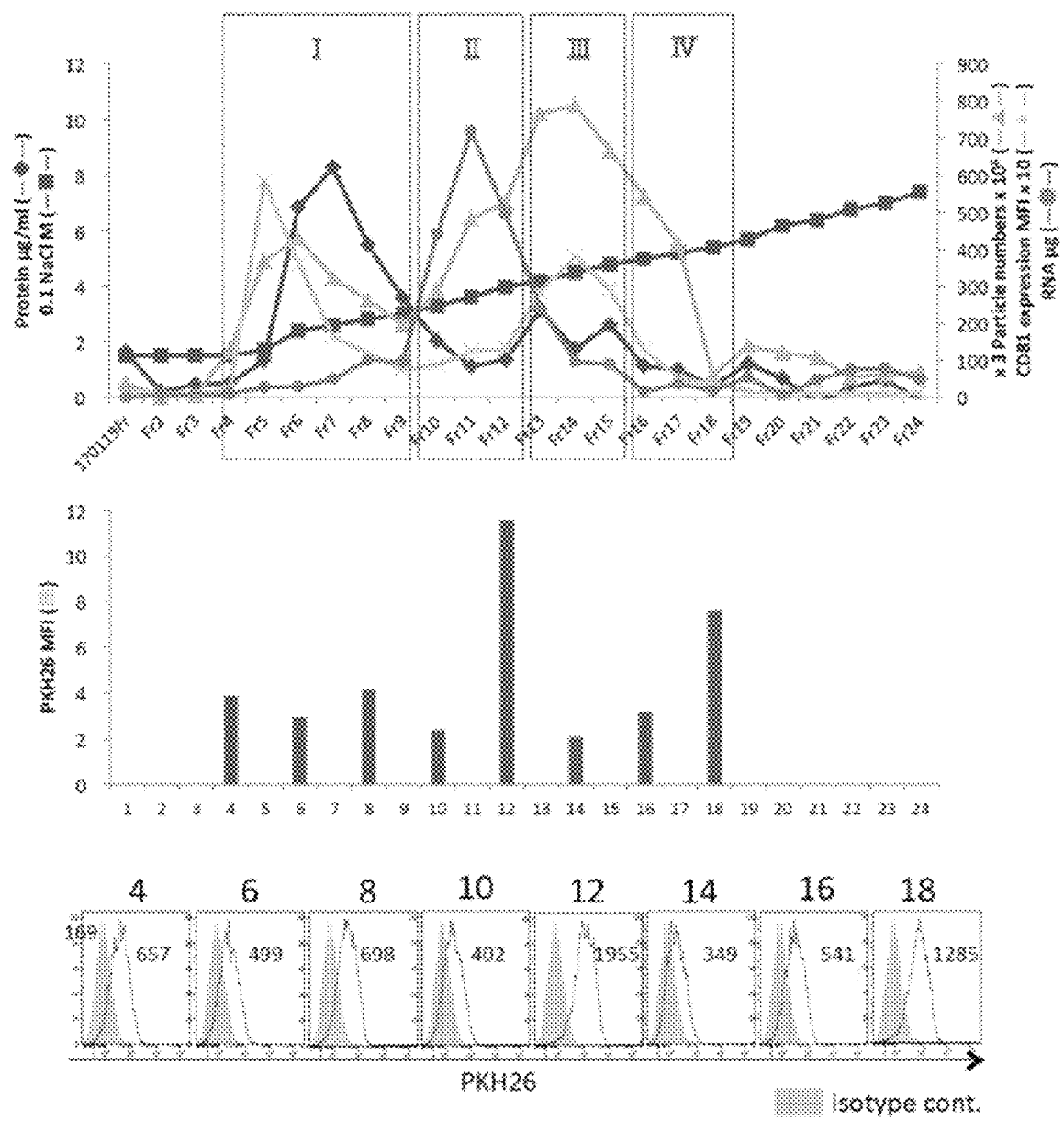
FIG. 3 is a diagram showing that exosomes excellent in incorporation into MSCs (Mesenchymal Stem Cells) can be obtained in a single fraction.

FIG. 3 shows an exosome fraction with excellent incorporation into the MSC. Exosomes are concentrated from the culture supernatant of HEK293.2sus cells using a 750 kDa MWCO ultrafiltration membrane and separated by a DEAE ion exchange column. For the obtained fraction, the exosome contained in each fraction is stained with a PKH26 fluorescent substance, and then the incorporation of the labeled exosomes into the cultured MSC was examined. As a result, it has been found that exosomes which appeared to have functionality to be strongly incorporated by MSC can be obtained in a single fraction of Fr.12. In this way, the method of preparing exosome of the present invention can be used as a means for extracting only effective exosomes.

Preferential Engulfment of EVs by MSCs in a Negative Charge-Dependent Manner

EV-engulfing capacity of MSCs may vary depending on the negative charge of EVs, as well as the variation of the number of particles, protein concentrations, CD 81 expression and RNA content in EVs. Therefore, HEK293.2sus EVs from each fraction obtained after ion-exchanged chromatography were stained with PKH26 and added to MSC culture medium at a concentration of $5\times10^8$ particles/mL. Surprisingly, only EVs in Fr. 12 were aggressively engulfed by MSCs, while substantial uptake was shown with EVs in Fr. 18. These results indicate that the EV membrane structure readily incorporated into MSCs correlates with a constant EV negative charge. In addition, it is supposed that EVs eluted with approximately 0.4 M NaCl (Fr. 12) are functional exosomes containing a large amount of RNAs for cell-to-cell communication. On the other hand, EVs from Fr. 18 may be decomposed by scavenger receptor-expressing macrophages by a strong negative charge. Thus, the method of preparing exosome of the present invention can separate exosomes having the functions from exosomes that are decomposed prior to expressing the functions.

Example 2

The fractionation of human PBMC exosomes and murine CD8$^+$ T cell exosomes, and the analyses of biological characteristics of the exosomes (Fractionation of Exosomes)

EVs were prepared from culture supernatants of human PBMCs cultured for 11 days according to the method described in Example 1. The obtained EVs were fractionated by anion exchange chromatography using 100 mL of DEAE-Sepharose Fast Flow (Ge Healthcare) after concentration by ultrafiltration using a MWCO 750 kDa filter equivalent to about 50 nm of the filter pore size, as in Example 1. The elution of EVs from the DEAE-Sepharose column was performed with a linear gradient of NaCl (0.15 M to 0.8 M) and all fractions eluted with 0.15 M to 0.5 M NaCl are pooled. According to the method described in Example 1, EVs were prepared from culture supernatants (4 L) of CD8$^+$ T cells obtained from DUC18 mice and cultured for 7 days. The obtained EVs were fractionated by anion exchange chromatography using 100 mL of DEAE-Sepharose Fast Flow (Ge Healthcare) after concentration by ultrafiltration using a MWCO 750 kDa filter equivalent to about 50 nm of the filter pore size, as in Example 1. The elution of EVs from the DEAE-Sepharose column was performed with a linear gradient of NaCl (0.15 M to 0.8 M) or in a stepwise manner with 0.3 M and 0.5 M NaCl. An elution pattern of EVs with the linear gradient is shown in FIG. 5A and an elution pattern of EVs in the stepwise manner is shown in FIG. 5B.

(Cytotoxicity Against Tumor Stroma of Exosomes Fractionated by the Linear Gradient of NaCl)

Cytotoxicity against tumor stroma of murine CD8$^+$ T cell exosomes contained in Fr. 21 (a fraction eluted with 0.21 to 0.3 M NaCl) and Fr. 26 (a fraction eluted with 0.38 M NaCl) in FIG. 5A (an elution pattern eluted with a linear gradient of NaCl) were compared. Exosomes of respective fractions were administered to CMS5a tumors implanted subcutaneously for two weeks in BALB/c mice. Three days after the exosome administration, the presence of tumor stroma composed of mesenchymal cells of CD140a+ Sca-1+ was examined by immunohistostaining. In consequence, the tumors administered Fr. 21 (a fraction eluted with 0.21 M to 0.3 M NaCl) lost the mesenchymal tumor stroma (FIG. 6A), but the tumors administered Fr. 26 (a fraction eluted with 0.38 M NaCl) retained the mesenchymal tumor stroma (FIG. 6B). As a result, it is shown that the exosomes that retain biological activities can be separated from exosomes without the activities by elution salt concentration in anion exchange column chromatography. That is, it is indicated that the functional exosomes can be separated from the non-functional exosomes by subjecting the concentrated liquid obtained by the above-mentioned ultrafiltration to anion exchange column chromatography.

(Biological Features of the Exosome Fractionated with NaCl in a Stepwise Manner)

Based on the above-mentioned results, biological features for the two exosome fractions fractionated with different concentrations of NaCl in the stepwise elution, which was easy to conduct the elution process, were compared. For this purpose, the exosomes in Frs. 3 and 4 eluted with 0.3 M NaCl (0.3 M-Frs.3 and 4) and in Fr. 3 eluted with 0.5 M NaCl (0.5 M-Fr. 3) were used shown in FIG. 5B.

Nano-Particle Tracking Analysis

Figure 7:
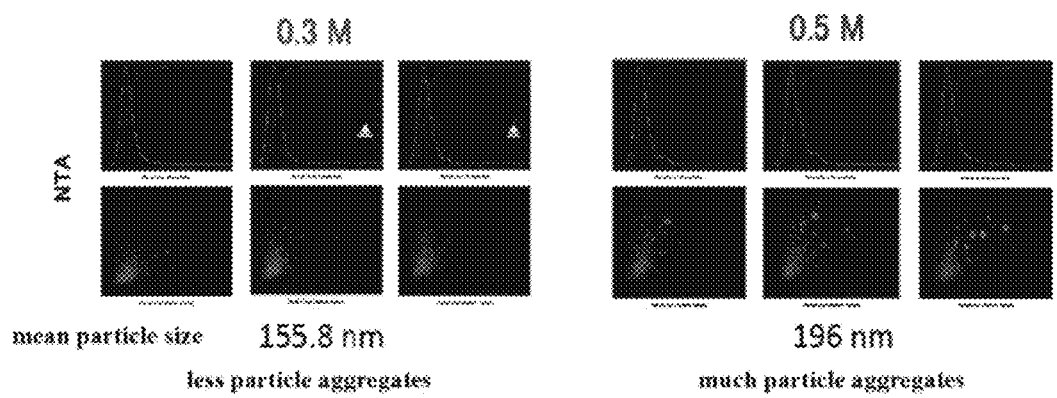
FIG. 7 shows a result of nano-particle tracking analysis (NTA) on exosomes eluted with 0.3 M and 0.5 M NaCl in anion exchange column chromatography.

When analyzed by nano-particle tracking analysis (NTA), the average particle sizes of exosomes eluted with 0.3 M NaCl and 0.5 M NaCl were 155.8 nm and 196 nm, respectively. Furthermore, the results that the 0.3 M NaCl-eluted exosomes had less-aggregated particles, whereas 0.5 M NaCl-eluted exosomes had more aggregated particles have been obtained (FIG. 7). By choosing the salt concentration for elution in anion exchange chromatography, it is indicated the quality control of exosomes to obtain can be achieved. An appropriate salt concentration may be different depending on the cell type to prepare exosomes, animal species, and conditions for ion exchange chromatography, but those skilled in the art can easily determine the appropriate salt concentration by preliminarily examining quality of exosome and the salt concentration using for elution of the exosome.

Measurements of Zeta Potentials

Figure 8:
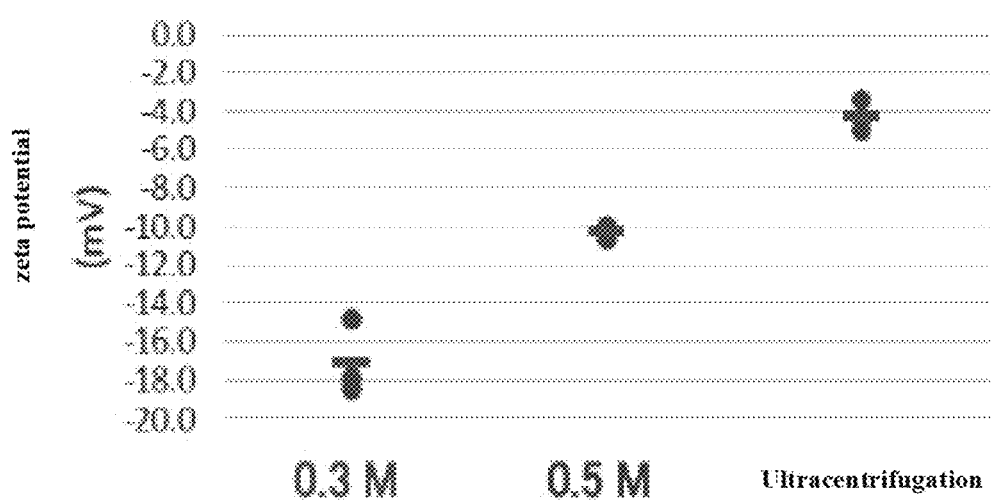
FIG. 8 shows a result of measuring zeta potentials for exosomes eluted with 0.3 M and 0.5 M NaCl in anion exchange column chromatography, as well as exosomes prepared by ultracentrifugation.

The zeta potentials of exosome particles eluted from the anion exchange chromatography column was compared with those of exosome particles prepared by ultracentrifugation according to the method described in Example 1 using a zeta potential measuring device. The results are shown in FIG. 8. Compared to the exosomes eluted from the anion exchange chromatography column, it has been found that the exosomes prepared by ultracentrifugation are the particles which are easily aggregated with a small absolute value of zeta potentials (FIG. 8). Further, as mentioned above, in the exosomes eluted by anion exchange chromatography, 0.3 M NaCl-eluted exosomes had less-aggregated particles with a small absolute value of zeta potentials. On the other hand, 0.5 M NaCl-eluted exosomes have been shown to have an absolute value of zeta potential larger than that of ultracentrifugation-separated exosomes but have a smaller absolute value of zeta potential than 0.3 M NaCl-eluted exosomes, indicating that 0.5 M NaCl-eluted exosomes easily aggregate compared to 0.3 M NaCl-eluted exosomes (FIG. 8). That is, the high number of aggregated particles is given in the order of ultracentrifugation-separated exosomes >0.5 M NaCl-eluted exosomes >0.3 M NaCl-eluted exosomes, which is shown to correlate with the absolute value of zeta potential. Therefore, it is indicated that the quality control of the exosomes or the selection of the required exosomes can be performed by setting the zeta potential threshold in advance.

Analysis by SDS-Polyacrylamide Gel Electrophoresis (PAGE)

Figure 9:
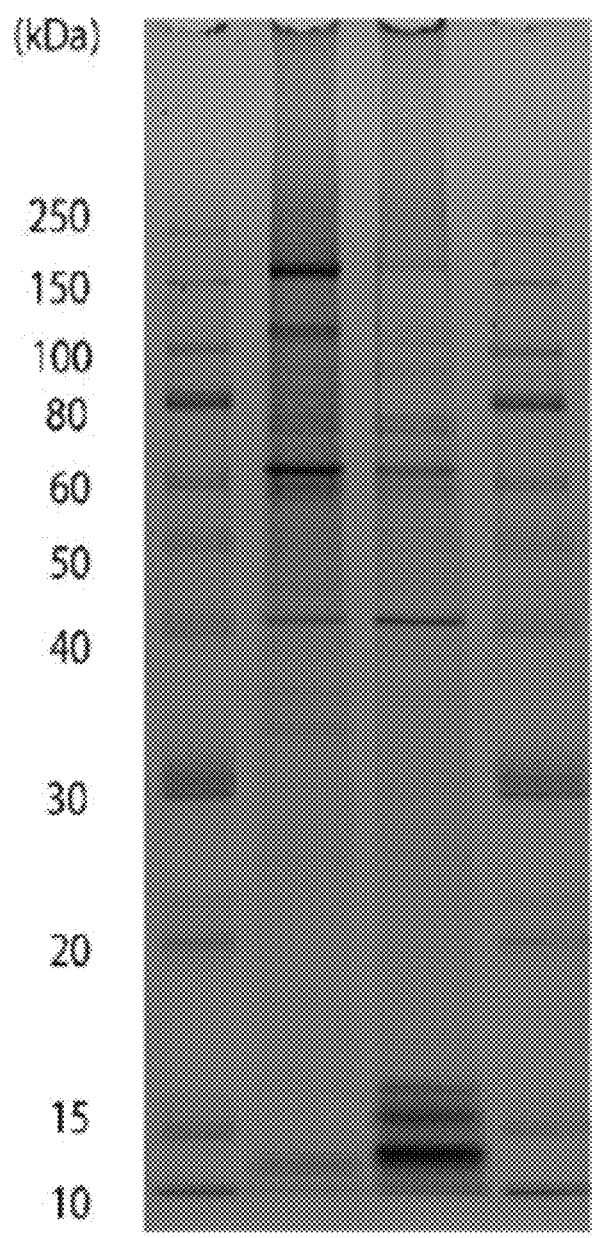
FIG. 9 shows a result of SDS-polyacrylamide gel electrophoresis analysis of exosomes eluted with 0.3 M and 0.5 M NaCl in anion exchange column chromatography.

The results obtained by analyzing the proteins contained in the exosomes eluted by anion exchange chromatography by SDS-PAGE are shown in FIG. 9. Analytical methods for SDS-PAGE are well known to those skilled in the art. By comparing 0.3 M NaCl-eluted exosomes with 0.5 M NaCl-eluted exosomes as shown in FIG. 9, the electrophoretic pattern of proteins contained in exosomes differ from one another. This fact suggests that both exosomes have different physical properties from one another.

Analysis of RNA Contained in Exosomes

Figure 10A:
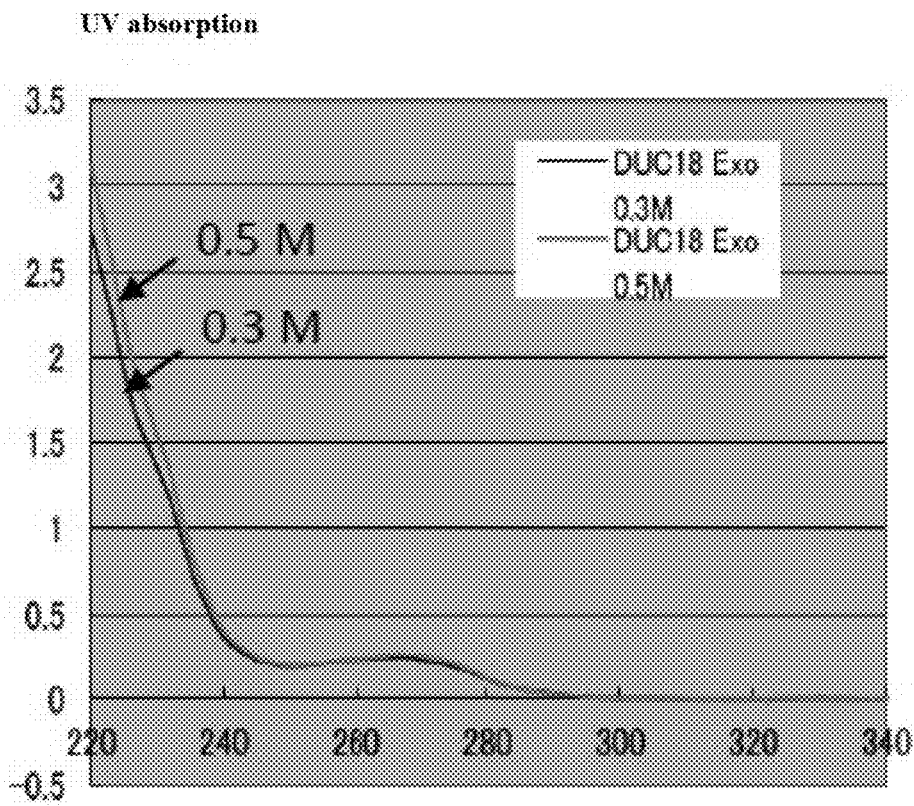
FIG. 10A-B shows a result of analyzing total RNA (miRNA, tRNA, mRNA and rRNA) of exosomes eluted with 0.3 M and 0.5 M NaCl in anion exchange column chromatography by (A) a UV absorption spectrum, and (B) a bioanalyzer.
Figure 10B:
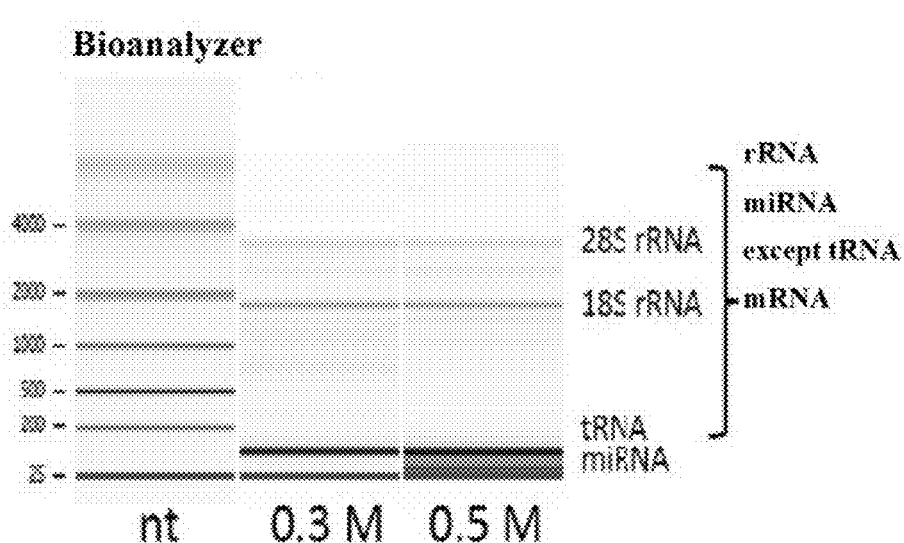

The results of examining the presence of RNA in the exosomes eluted by anion exchange chromatography are shown in FIG. 10. FIG. 10A shows UV absorption spectra of total RNAs (miRNA, tRNA, mRNA and rRNA) contained in 0.3 M NaCl-eluted and 0.5 M NaCl-eluted exosomes. UV absorption was observed at 260 to 270 nm in any exosome fraction, indicating that RNAs were contained in any exosome fraction. The RNA was analyzed by a bioanalyzer (Agilent Company). As a result, it has been shown that both exosomes eluted with 0.3 M and 0.5 M NaCl contain low molecular RNAs (FIG. 10B).

Since the exosomes eluted by anion exchange chromatography contained low molecular RNAs, analysis of miRNA contained in the column-eluted exosomes was performed (FIG. 11). As a result of the analysis, it has been found that the 0.3 M NaCl-eluted exosomes contain a large amount of Let-7 family of miRNA and miRNA with low number (2-digit number) compared to 0.5 M NaCl-eluted exosomes. Many of these miRNAs have functions. On the other hand, 0.5 M NaCl-eluted exosomes contain a large amount of unknown and functionless miRNA with high number (4-digit number). These results are consistent with that 0.3 M NaCl-eluted exosomes are functional exosomes in terms of having cytotoxicity against tumor stroma, and 0.5 M NaCl-eluted exosomes are non-functional exosomes. It is shown that functional exosomes and non-functional exosomes can be separated by the NaCl stepwise fractionation in anion exchange chromatography.

Analysis of DNA Contained in Exosomes

Figure 12:
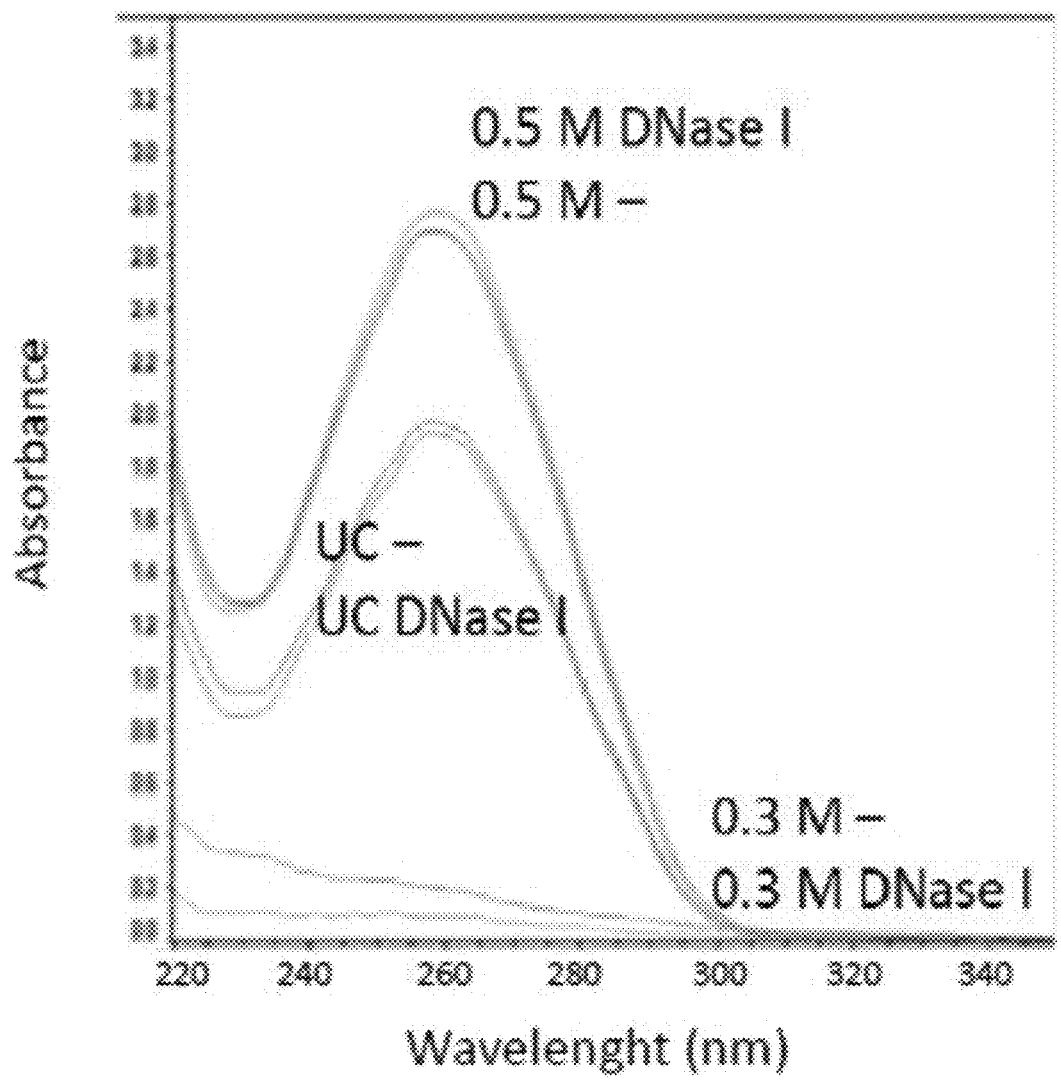
FIG. 12 shows results of analyzing the DNA present outside the EV and total DNA contained in 0.3 M NaCl- and 0.5 M NaCl-eluted exosomes in anion exchange column chromatography, as well as ultrafiltration-separated exosomes (UC).

DNAs were extracted by using an Exosomal DNA Extraction Kit (101Bio) from the exosomes eluted by anion exchange chromatography (0.3 M NaCl-eluted exosomes and 0.5 M NaCl-eluted exosomes) and the ultracentrifugation-separated exosomes (UC) after DNase I treatment, and then examined the UV absorption spectra. DNAs were similarly extracted from the exosomes untreated with DNase I, and then examined the UV absorption spectra were analyzed. The results are shown in FIG. 12. The exosomes treated with DNase I are displayed as "DNase I", and the exosomes untreated with DNase I are displayed as "-". The 0.3 M NaCl-eluted exosomes and the ultracentrifugation-separated exosomes showed no UV absorption at 260 nm to 270 nm, regardless of DNase I treatment, indicating that almost no DNA is contained in the exosomes. On the other hand, the 0.5 M NaCl-eluted exosomes and the ultracentrifugation-separated exosomes showed UV absorption at 260 nm to 270 nm, which is hardly affected by DNase I treatment, indicating that there is little DNA on the outside of the 0.5 M NaCl-eluted exosomes and the ultracentrifugation-separated exosomes, and the DNA is shown to be included in the exosome. The lack of DNA in 0.3 M NaCl-eluted exosomes indicates that there is at low risk for production of autoantibody against DNA.

Example 3

Biological Activities of Human T Cell (PBMC) Exosomes (Cytotoxicity)

Figure 13:
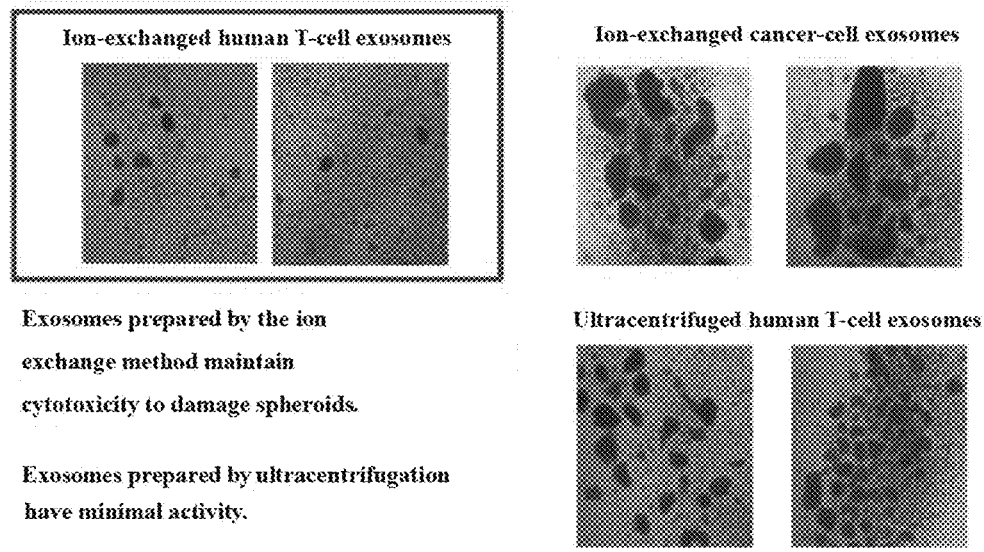
FIG. 13 is a microphotograph showing cytotoxic activities of human T-cell exosomes eluted from anion exchange column for spheroids formed from MKN45 cells and CAF derived from lung cancer.

A culture supernatant of human PBMCs was prepared according to the method described in Example 1, and human T cell (PBMC) exosomes eluted from an ion exchange column (all exosomes eluted with 0.15 M to 0.5 M NaCl) were prepared according to the method of the present invention. Similarly, exosomes derived from human cancer cells (MKN45) and eluted from an ion exchange column are prepared. For comparison, ultracentrifugation-separated exosomes were prepared from the culture supernatant of human PBMCs according to Example 1. MKN45 cells and lung cancer-derived CAF (cancer-associated fibroblast) with $2 \times 10^4$ each were mixed and added to a non-adherent 24-well plate (Day 0). A spheroid mimicking a tumor microenvironment was formed on the next day (Day 1). On Day 1, the above-mentioned three kinds of exosomes are added in 2 µg/well, respectively, and whether the spheroid collapsed in Day 10, that is, whether the CAF region disappeared was observed. The results are shown in FIG. 13. When human T-cell exosome eluted from an ion exchange column was added, the spheroid was collapsed. However, the collapse of spheroid was not observed with human cancer cell exosomes eluted from the ion exchange column, and the collapse of spheroids was only weakly observed with the ultracentrifugation-separated human T-cell exosomes. In cytotoxicity, human T-cell exosomes eluted from the ion exchange column maintains the activity, but it can be seen that the activity of the ultracentrifugation-separated human T-cell exosomes are significantly reduced.

(Antitumor Action in Mice)

Figure 14:
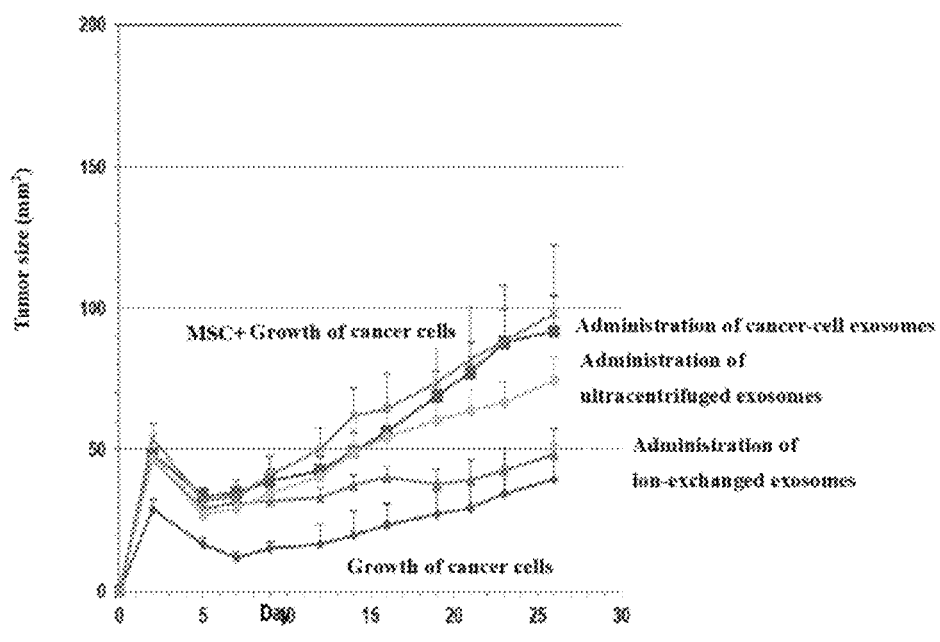
FIG. 14 shows antitumor effects of human T-cell exosomes eluted from anion exchange column in nude mice implanted with a mixture of mesenchymal stem cells and human cancer cells.

Growth inhibitory effects on human tumor in mice of the human T-cell exosomes eluted from the ion exchange column, the human cancer-cell exosomes eluted from the ion exchange column and the ultracentrifugation-separated exosomes were compared. NW-MEL-38 cancer cells and hTERT-MSC (Mesenchymal Stem cells) with $1.5 \times 10^6$ each were mixed with 5 µg of cancer-cell (MKN45) derived exosomes prepared by the ion exchange method, human PBMC exosomes prepared by the ultracentrifugation method or human PBMC exosomes prepared by the ion exchange method in the same manner as described above, and then subcutaneously administered to nude mice. As control groups in which exosomes were not administered, a mixed-cell transplantation group with NW-MEL-38 cancer cells and hTERT-MSC and a transplantation group with NW-MEL-38 cancer cells were set. Tumor growth was measured over 26 days after the subcutaneous transplantation. The results are shown in FIG. 14. The human cancer-cell exosomes eluted from the ion exchange column showed no inhibitory effects on tumor growth come from the mixed cells with NW-MEL-38 cancer cells and hTERT-MSC. When the human PBMC exosomes prepared by the ultracentrifugation method were administered, only weak inhibitory effects on tumor growth were observed. On the other hand, when the human T-cell exosomes eluted from the ion exchange column were administered, strong inhibitory effects on tumor growth were observed where the tumor growth rate became the same as the tumor growth rate revealed by single transplantation of the cancer cells. From the above results, it has been shown that functional exosomes can be prepared by concentrating the culture supernatant of human T cells using a MWCO 750 kDa filter, followed by eluting from the anion exchange column.

The invention claimed is:

1. A method for preparing exosomes from a biological sample, the method comprising: (i) a step for performing centrifugal separation on a biological sample to remove contaminants from the sample, and then obtaining a supernatant; (ii) a step for subjecting the supernatant obtained in the step (i) to ultrafiltration by using a tangential flow filter having a nominal molecular weight cut-off (MWCO) of about 750 kDa and a pore size of 0.22 µm, and then concentrating the supernatant; and (iii) a step for subjecting a concentrated liquid obtained in the step (ii) to anion exchange column chromatography, wherein an anion exchanger used in the anion exchange column chromatography is a weakly basic anion exchanger, which retains selectivity based on both hydrophobic interaction and hydrophobic binding formation, and has a phenyl group, an amide bond, and a carboxyl group.

2. The method according to claim 1, wherein the step (i) comprises performing centrifugation at 10,000×g for 30 minutes.

3. The method according to claim 1, wherein the anion exchange column chromatography is carried out in a presence of 0.15 M to 0.8 M NaCl or KCl.

4. The method according to claim 1, wherein the anion exchange column chromatography is performed at a neutral pH.

5. The method according to claim 1, wherein the anion exchange column chromatography is performed at a pH of 7.2 to pH 7.7.

6. The method according to claim 1, additionally comprising the following step of:
  (iv) measuring a zeta potential of an eluate of the anion exchange column chromatography.

* * * * *